United States Patent
Surnarayana

(10) Patent No.: US 10,268,568 B2
(45) Date of Patent: Apr. 23, 2019

(54) SYSTEM AND METHOD FOR DATA ELEMENT TRACING

(71) Applicant: Infosys Limited, Bangalore (IN)

(72) Inventor: Pradeep Kumar Kondagula Surnarayana, Hassan (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 15/471,982

(22) Filed: Mar. 28, 2017

(65) Prior Publication Data
US 2017/0286264 A1    Oct. 5, 2017

(30) Foreign Application Priority Data
Mar. 29, 2016    (IN) ................................. 201641017066

(51) Int. Cl.
*G06F 11/36* (2006.01)
*G06F 11/34* (2006.01)

(52) U.S. Cl.
CPC .......... *G06F 11/3636* (2013.01); *G06F 11/34* (2013.01); *G06F 11/362* (2013.01); *G06F 11/3608* (2013.01)

(58) Field of Classification Search
CPC ........ G06F 8/433; G06F 8/43; G06F 11/3636; G06F 11/3608; G06F 11/362
USPC ........................................................ 717/128
See application file for complete search history.

(56) References Cited

U.S. PATENT DOCUMENTS

| | | | |
|---|---|---|---|
| 5,671,419 A | | 9/1997 | Carini et al. |
| 6,311,327 B1 * | | 10/2001 | O'Brien .............. G06F 11/3466 714/35 |
| 7,712,093 B1 | | 5/2010 | Foley |
| 8,572,577 B2 | | 10/2013 | Bates et al. |
| 8,584,108 B2 | | 11/2013 | Sukumaran et al. |
| 8,656,377 B2 | | 2/2014 | Xu et al. |
| 8,875,109 B2 | | 10/2014 | Murthy |
| 8,893,280 B2 | | 11/2014 | Jung et al. |
| 2002/0174415 A1 * | | 11/2002 | Hines ....................... G06F 8/36 717/127 |
| 2003/0056192 A1 | | 3/2003 | Burgess |
| 2004/0068715 A1 * | | 4/2004 | Wong .................... G06F 9/4862 717/136 |
| 2004/0264367 A1 * | | 12/2004 | Edwards ................ G06F 8/433 370/229 |
| 2007/0018980 A1 * | | 1/2007 | Berteig .................. G06T 15/80 345/426 |
| 2008/0127107 A1 * | | 5/2008 | Kosche ............... G06F 11/3447 717/128 |

(Continued)

*Primary Examiner* — Jason D Mitchell
(74) *Attorney, Agent, or Firm* — Klarquist Sparkman, LLP

(57) ABSTRACT

A method and system of a method of tracing a data element for flow analysis includes receiving an input of a data element to be traced, tagging the data element to be traced and selecting one or more tiers of an application to trace the flow of the tagged data element. The selected one or more tiers of the application are parsed through a plugin associated with a software programming language and an entry is recorded at the plugin associated with a software programming language, when an instance of traced data element is encountered. A database entry is created for every encounter of the tagged data element. Further, a data flow graph is generated to trace the data element across the at least one application tier.

11 Claims, 9 Drawing Sheets

(56) References Cited

U.S. PATENT DOCUMENTS

| | | |
|---|---|---|
| 2009/0106741 A1* | 4/2009 | Dageville ........... G06F 11/3636 717/128 |
| 2009/0138858 A1* | 5/2009 | Livshits .............. G06F 11/3419 717/130 |
| 2010/0153921 A1 | 6/2010 | Klein |
| 2011/0258611 A1* | 10/2011 | Dutta .................. G06F 11/3612 717/128 |
| 2012/0185829 A1* | 7/2012 | Yaffe .................... G06F 11/362 717/125 |
| 2016/0239276 A1* | 8/2016 | MacLean ................ G06F 8/433 |
| 2017/0161167 A1* | 6/2017 | Obermiller ........... G06F 11/364 |

* cited by examiner

| Field Name | Type | File Name | Line No | Operator | Action | Transformed Variable | Tier | Next File | Path | Is Leaf? | Tier Completed? | Proposed Next Tier |
|---|---|---|---|---|---|---|---|---|---|---|---|---|
| AccNo | JSP | Xyz.jsp | 10 | = | Assignment | Aname | 1 | | | No | No | |
| Aname | JSP | Xyz.jsp | 9 | | Form | | | | | No | No | |
| AccNo | Java Script | Xyz.jsp | 15 | | JS call | | 1 | Abc.java | | Yes | Yes | 2 |
| Aname | PLSQL | Abc.sql | 15 | = | Assignment | Bname | 2 | Mnp.sql | | No | No | |
| Aname | PLSQL | Mnp.sql | 18 | | Modification | Cname | 2 | | | No | No | |

DATA MODEL

SYSTEM AND METHOD FOR DATA ELEMENT TRACING

FIELD OF TECHNOLOGY

The present disclosure relates to methods and systems for data element tracing and more particularly to tracing a data element across one or more tiers of an application for flow analysis.

BACKGROUND

Migration of legacy applications may seem like a huge task given the difficulty to track the changes various data variables undergo during the process of migration. When a bug fix needs to be done over software code, there is need to identify various changes a variable undergoes. In today's scenarios, the variable may travel across various technologies and software programming languages, making it difficult to track and analyze. Due to the various types of system and technologies involved in large projects, it makes it almost impossible to look for data anomalies and pinpoint various touch points between different layers of an application or a project.

SUMMARY

Disclosed are a method, an apparatus and/or a system for data element tracing.

In one aspect, a method of tracing a data element for flow analysis includes receiving an input of a data element to be traced, tagging the data element to be traced and selecting one or more tiers of an application to trace the flow of the tagged data element. The selected one or more tiers of the application are parsed through a plugin associated with a software programming language and an entry is recorded at the plugin associated with a software programming language, when an instance of traced data element is encountered. A database entry is created for every encounter of the tagged data element. Further, a data flow graph is generated based on the parsing to trace the data element across the one or more application tiers.

In another aspect, a system of tracing a data element for flow analysis includes a computer network, data processing device associated with one or more processors, a user interface operably connected to the data processing device and a graphic processing device and one or more memory units operatively coupled to the data processing device over the computer network and having instructions stored thereon that, when executed by the one or more processors, cause the data processing device to: receive an input of a data element to be traced, tag the data element to be traced, select one or more tiers of an application to trace the flow of the tagged data element and parse, through the data processing device, the selected one or more tiers of the application through a plugin associated with a software programming language.

Further, the plugin associated with the software programming language is invoked on determination of the software programming language and based on the flow, another plugin associated with another software programming language is invoked on determination of the another software programming language. A database entry is created through the data processing device for every data flow graph generated and an entry is recorded at the plugin associated with a software programming language, when an instance of traced data element is encountered. A data flow graph is generated to trace the data element across the at least one application tier. One or more of an assignment and a modification associated with the tagged data element is traced. Further, the data flow graph is displayed through the user interface in association with the graphic processing device and data processing device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the figures of the accompanying drawings, in which like references indicate similar elements and in which:

FIG. 8 is a database representation of a tagged data element, according to one or more embodiments.

Other features of the present embodiments will be apparent from the accompanying drawings and from the detailed description that follows.

DETAILED DESCRIPTION

Example embodiments, as described below, may be used to provide a method, an apparatus and/or a system of data element tracing. Although the present embodiments have been described with reference to specific example embodiments, it will be evident that various modifications and changes may be made to these embodiments without departing from the broader spirit and scope of the various embodiments.

Figure 1:
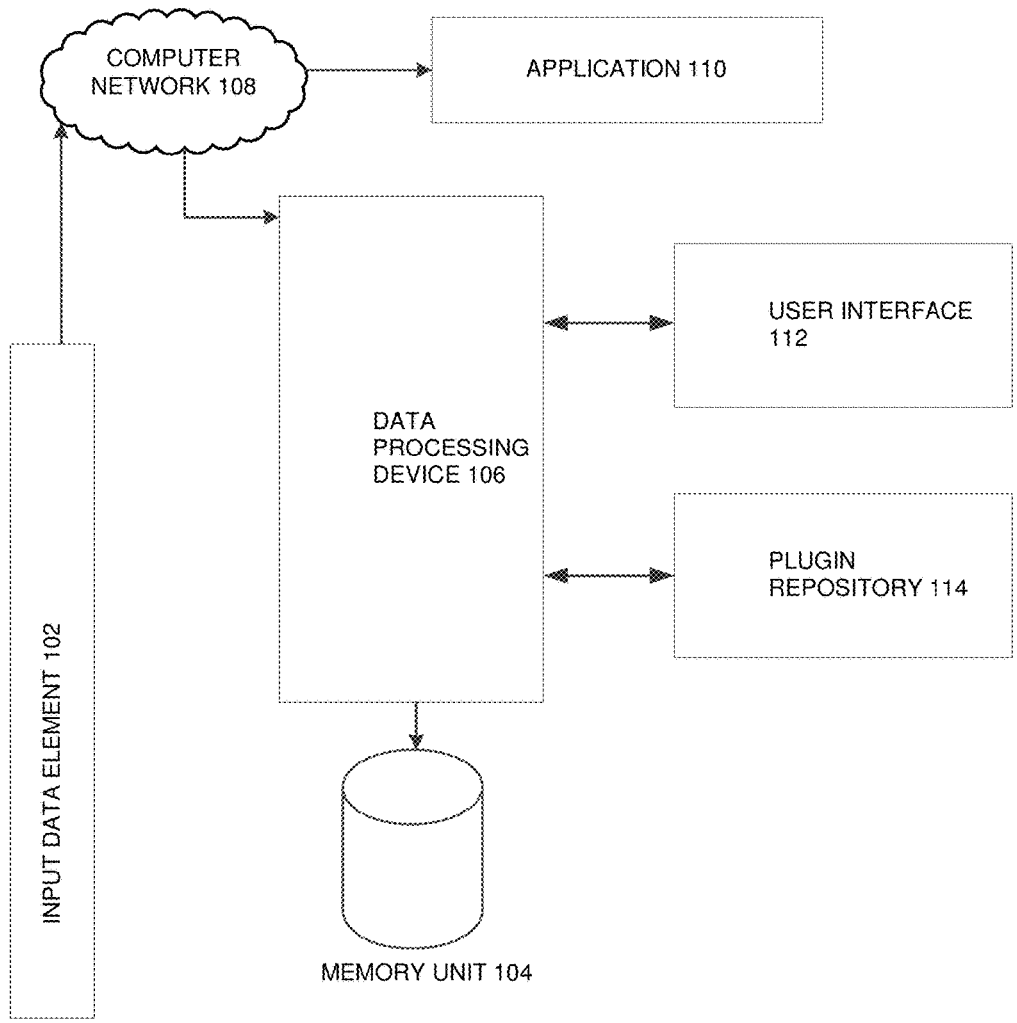
FIG. 1 is a diagrammatic representation of a system of data element tracing, according to one or more embodiments.

FIG. 1 is a diagrammatic representation of a system of data element tracing, according to one or more embodiments. FIG. 1 includes input data element 102, computer network 108, application 110, data processing device 106, memory unit 104, plugin repository 114 and user interface 112. The application 110 may receive an input data element 102 to be traced over computer network 108. The application 110 may be communicatively coupled to the data processing device 106 over the computer network 108. The data processing device 106 may be communicatively coupled to the plugin repository 114, the memory unit 104, and the use user interface 112.

Figure 2:
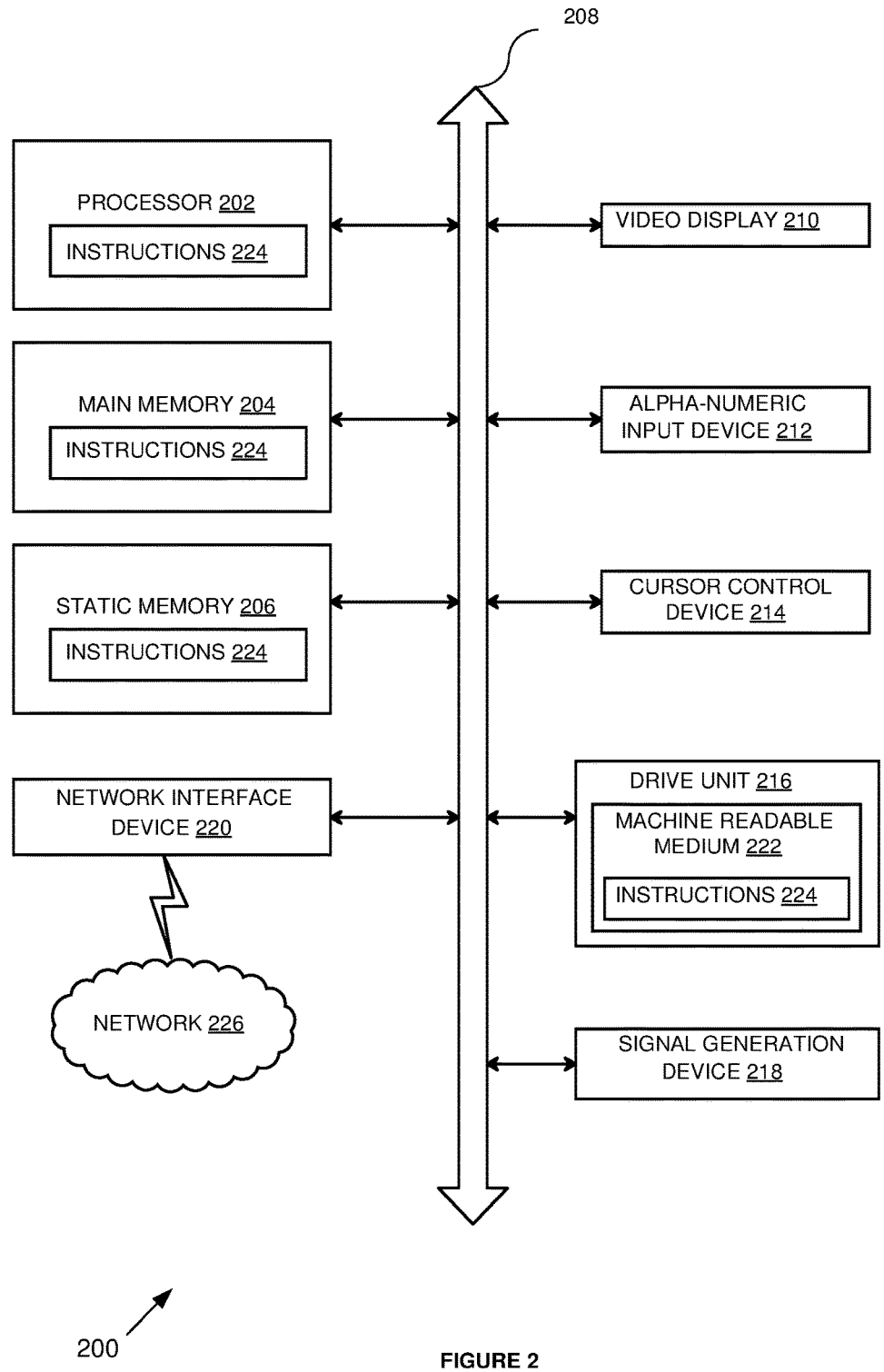
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 200 includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media.

Figure 3:
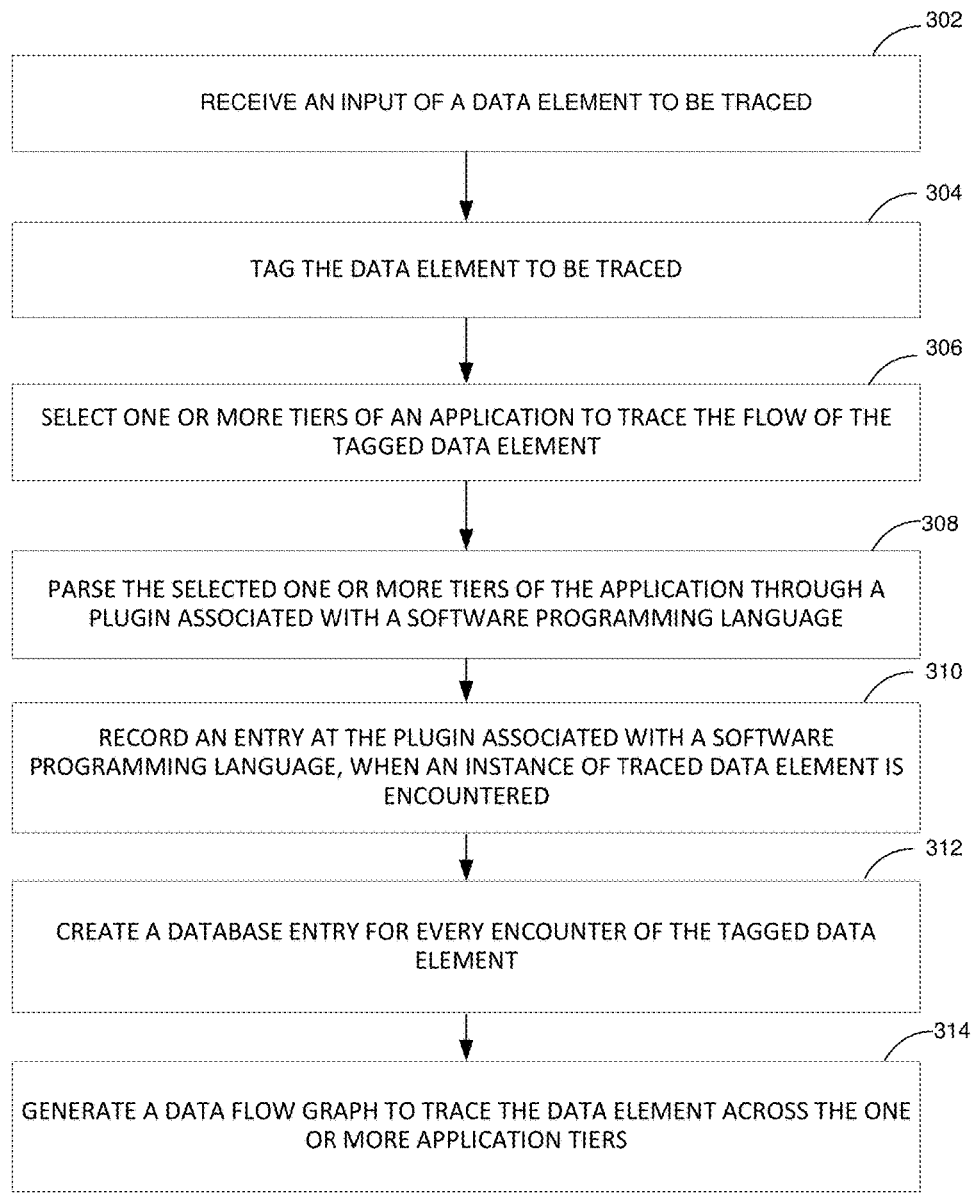
FIG. 3 is a process flow diagram detailing the operations of a method of a data element tracing, according to one or more embodiments.

FIG. 3 is a process flow diagram detailing the operations of a method of a data element tracing, according to one or more embodiments.

In one or more embodiments, a method of tracing a data element for flow analysis may include receiving an input of a data element to be traced 302, tagging the data element to be traced 304 and selecting one or more tiers of an application to trace the flow of the tagged data element 306. The selected one or more tiers of the application may be parsed through a plugin associated with a software programming language 308 and an entry is recorded at the plugin associated with a software programming language 310, when an instance of traced data element is encountered. A database entry may be created for every encounter of the tagged data element 312. Further, a data flow graph may be generated to trace the data element across the at least one application tier 314.

In one or more embodiments, an input for a variable to traced across one or more application tiers may be received. The input may also include a start point and an end point. The start point and end point may refer to locations in an application. The application may be associated with one or more layers and/or tiers. An orchestrator and/or integrated parser may tag the variable to be traced. The tag may be checked against a plugin database. The checking may lead to a plugin that matches with the tag. The plugin matching the tag may be invoked. The invoked plugin may trace the variable through a technology the plugin is compatible with. On encountering a function call and/or a call to another technology, the plugin may fail to be compatible with the another technology. A function call and/or the another technology code patch may be sent back to the orchestrator to find a new plugin to match the another technology.

Figure 4:
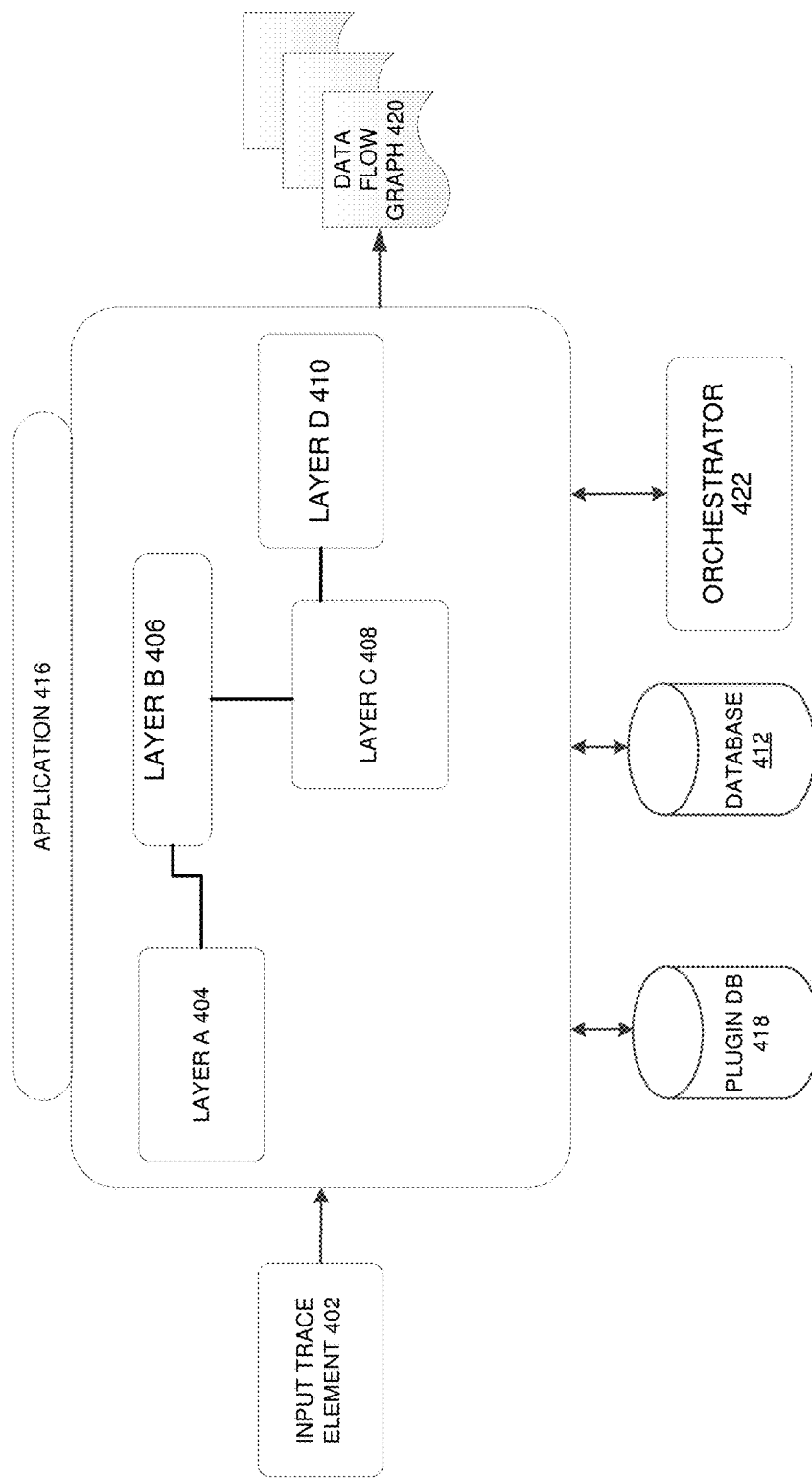
FIG. 4 is a diagrammatic representation of data element tracing across one or more application layers, according to one embodiment.

FIG. 4 is a diagrammatic representation of data element tracing across one or more application layers, according to one embodiment.

FIG. 4 may depict a system level view of data element tracing, according to one or more embodiments. FIG. 4 includes input trace element 402, data flow graph 420, plugin database 418, database 412, orchestrator 422 and application 416 associated with one or more layers and/or tiers. The one or more layers/tiers may include layer A 404, layer B 406, layer C 408 and layer D 410. The layers may represent one or more tiers of an application. In one or more embodiments, the application may refer to a software application hosted on a distributed computer network.

On receiving the input trace element 402, the orchestrator 422 (also referred to as engine) reads the input trace element 402 and redirects to a plugin corresponding to the programming language in which the input starting-point program is coded. The plugin may be associated with the plugin data base 418. The plugin may analyze a flow of the input trace element 402 within programs in the corresponding programming language.

During the course of the analysis, the plugin records the entries in a storage (typically a file and/or a database table). Each output record written by the plugin may contains a program name, line number within the program, an operation being performed, operator names and a flag notifying whether there is a call to another layer. If the flag is "yes"/"1", the plugin also records the exact call details in the output As soon as the plugin finishes the analysis, the plugin may pass control back to the orchestrator 422. Orchestrator 422 may scan the output records from the plugin and if there are no records which indicate that there is a call to another layer, by default it picks up the next layer from an input configuration file. The next layer (forward or backward) may depend on the end point given as input.

If there are plugin-output records indicating specific calls to a different layer, then the orchestrator 422 may picks up the "call details" and broadcast the "call details" it to one or more plugins associated with the plugin database 418. Another plugin associated with the plugin database 418 that finds a match may proceed to start with the analysis step.

The analysis of the input trace element is repeated across one or more tiers of the application 416 until the Orchestrator 422 may reach an end point that is provided as input and there are no more output records from one or more plugins which have "call to another layer" flag as "yes".

In one or more embodiments, a data flow graph 420 depicting an output of a data element trace may be generated. A more detailed view of a data flow graph may be found in FIG. 9.

Figure 5:
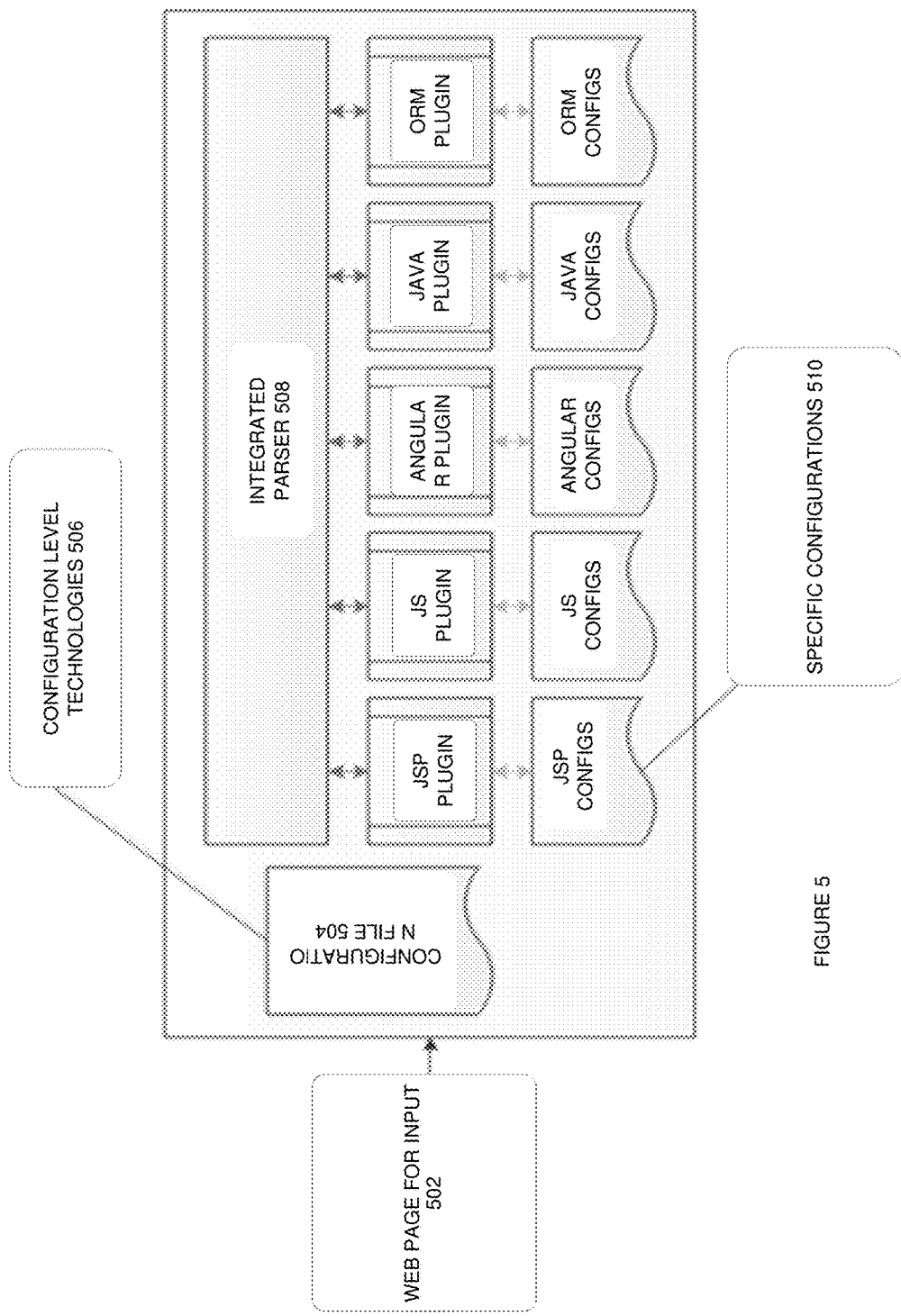
FIG. 5 is a diagrammatic representation of data element tracing, according to one example embodiment.

FIG. 5 is a diagrammatic representation of data element tracing, according to one example embodiment.

In an example embodiment, an input to a data element tracing system may include a data element to be analyzed. The data element may be a field in a feed file, database column, a variable in a particular program etc. Further, the data element for input may be received as a web page 502. The input may also include a program name, a start point, an end point and specific operations such as assignment and modification to be traced. In terms of starting point, the starting point may be a program name. The input may also include location and details of a main directory where software code is stored. The input may also include a configuration file 504. The configuration file 504 may have different layers of an application like a layer number, program type, file extensions and sub-directory where programs reside. For ex., if the application has 3 layers with presentation tier developed in JSP, middle tier in .NET and database tier in Oracle. A typical input may be "1|JSP|.JSP|\UI\JSP; 2|.NET|.txt|\MT\NET; 3|Oracle|.SQL|\DB\ORC".

In one or more embodiments, the layers may be configuration level technologies 506 and specific configurations 510 associated with the configuration level technologies 506. Configuration level technologies 506 may refer to one of more application tiers. In an example embodiment, in a three-tiered configuration level 1 may include JSP, JS, Angular and Jquery. Level 2 and level 3 may refer to Java and XML respectively.

Further, an integrated parser 508 may be associated with the specific configurations 510.

In an example embodiment, based on technologies such as J2EE, .NET, Main Frames etc. in an application, the trajectory orchestrator (i.e. an integrator which controls the flow across various plugins) may instruct a function or a program to look for the specified data value, to start with, in the tier/program given as the starting point. Inputs may include one or more of Data Element, File name to start parsing, File location, File extension and/or technology. Based on the file extension and/or technology, the orchestrator in turn may load respective grammar plug-in. This plugin may be a class with intelligence to identify the data element navigation within the programs of that particular language. Once this plugin provides the output back to the orchestrator, the orchestrator decides whether to invoke the plugin related to programming language in the next application tier or to broadcast the call to all the plugins and let each plugin decide if it is relevant to it. This process is repeated, till all the paths are exhausted.

The typical input may be also configured in a configuration file 504 for implementation. The ending point may be a particular layer of the application (example: Database, reporting layer etc.)

The Grammar configuration file may have information of possible assignment operators and/or various possible syntax for a particular software programming language. The information may help navigate to from one technology to another and/or within a same technology.

In an example embodiment, JSP Grammar plugin may parse through a JSP file and information about the data element being traced is sent back to the orchestrator. The information may include one or more of next possible function/method name in other programs, File path, Modified/transformed data element name, and possible file extension/technology.

On receiving the information, the orchestrator may decide the next parser plugin and again instruct the respective plugin to find the details in a next set of files.

Figure 6:
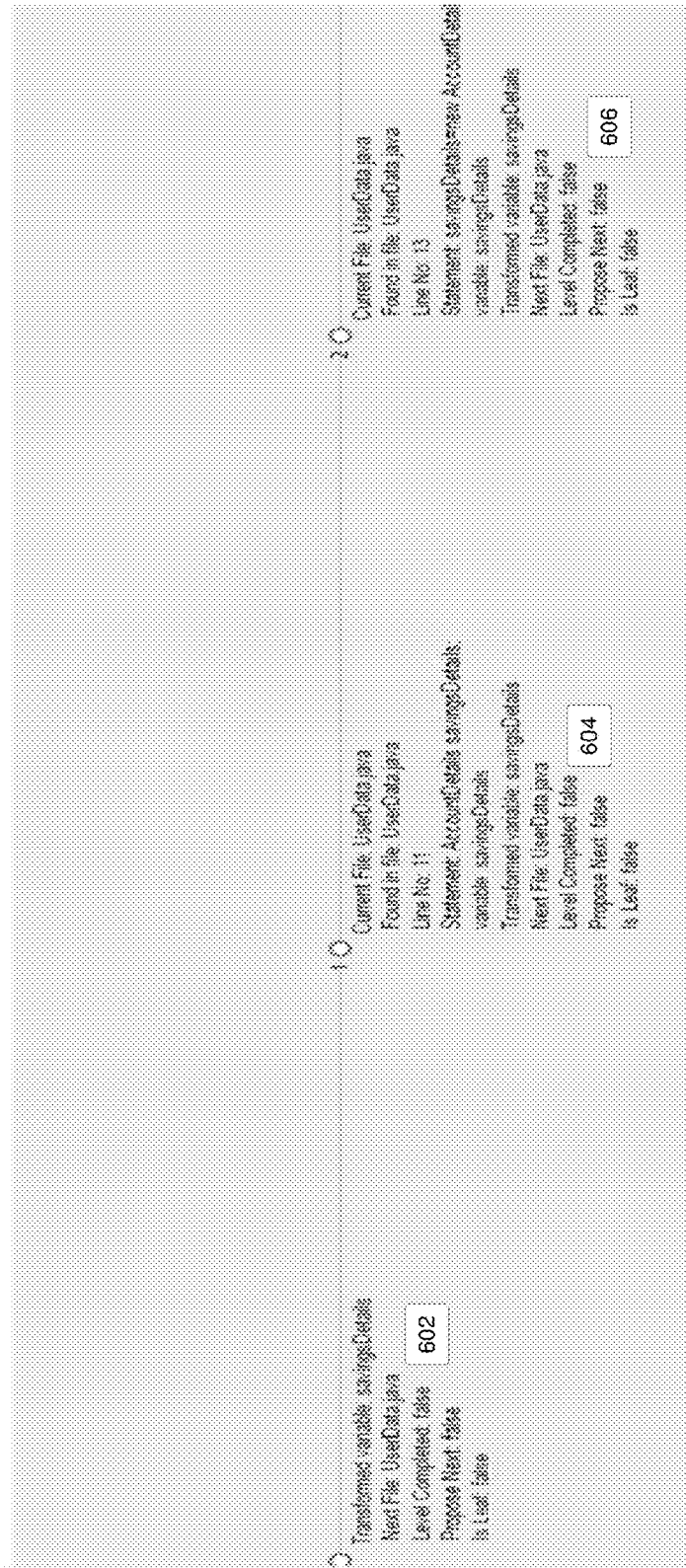
FIG. 6 is a data flow representation of data trajectory finder, according to one embodiment.

FIG. 6 is a data flow representation of data trajectory finder, according to one example embodiment. The data trajectory finder 600 may include one or more steps. Step 1 602 depicts tracing a variable savingsDetails across step 2 604 and step 3 606. The example embodiment may depict one or more checks at each step such as checking if the location is a leaf node, detailing the location and/or name of the next file to be traced for savingDetails, checking for completion of the application level and/or application tier.

Figure 7:
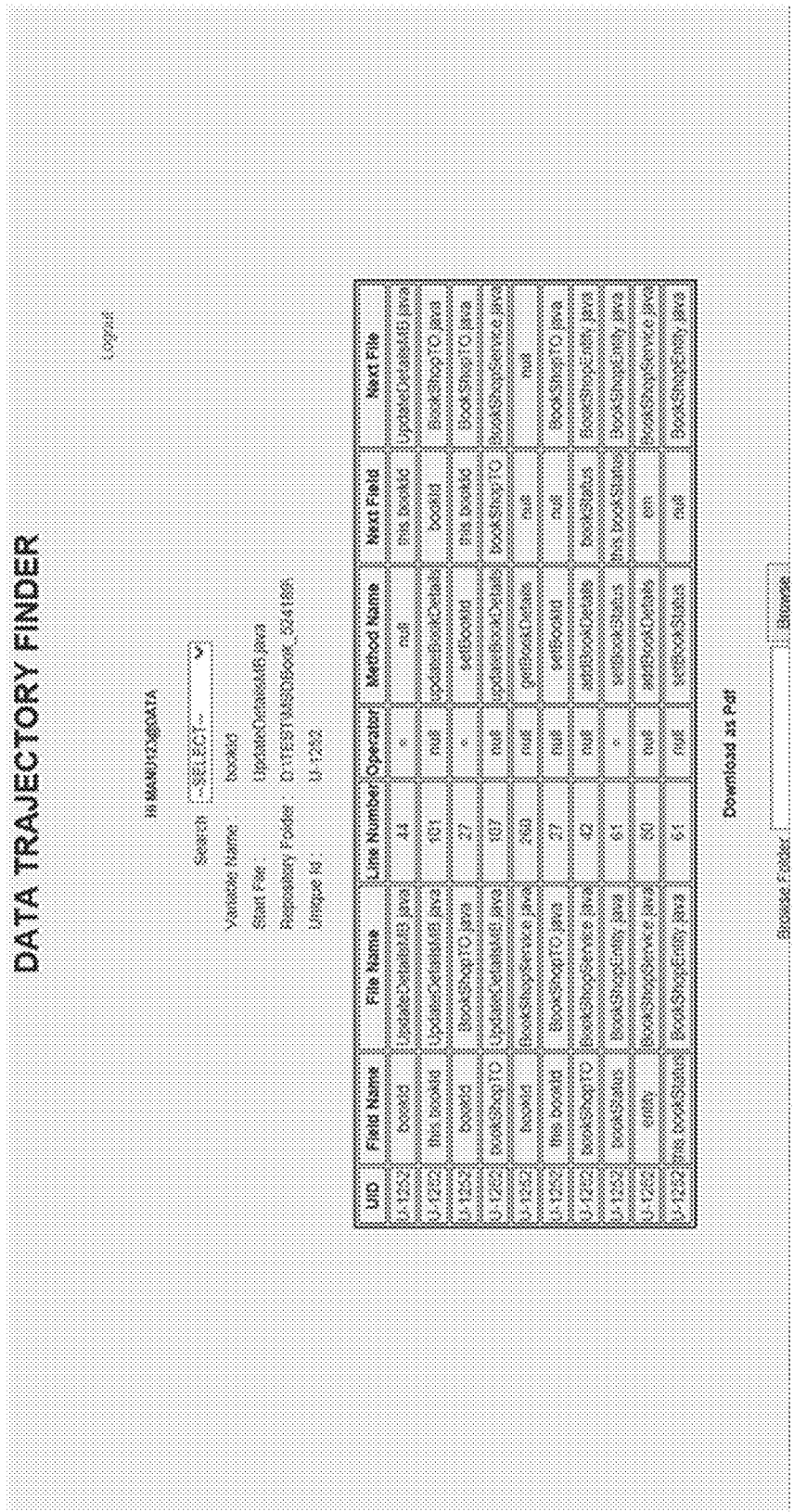
FIG. 7 is a diagrammatic representation of a user interface representation of a data trajectory finder, according to one example embodiment.

FIG. 7 is a diagrammatic representation of a user interface representation of a data trajectory finder, according to one example embodiment. A table may be used to represent the data trajectory finder through the user interface and/or to download the results in various formats.

FIG. 8 is a database representation of a tagged data element, according to one or more embodiments. The data base representation and/or data model represents a field name to be traced. The field name to be traced and associated properties such as one or more of type, file name, line number, operator, action, transformed variable, tier, next file, path, is a leaf node?, tier completed, and proposed next tier.

Figure 9:
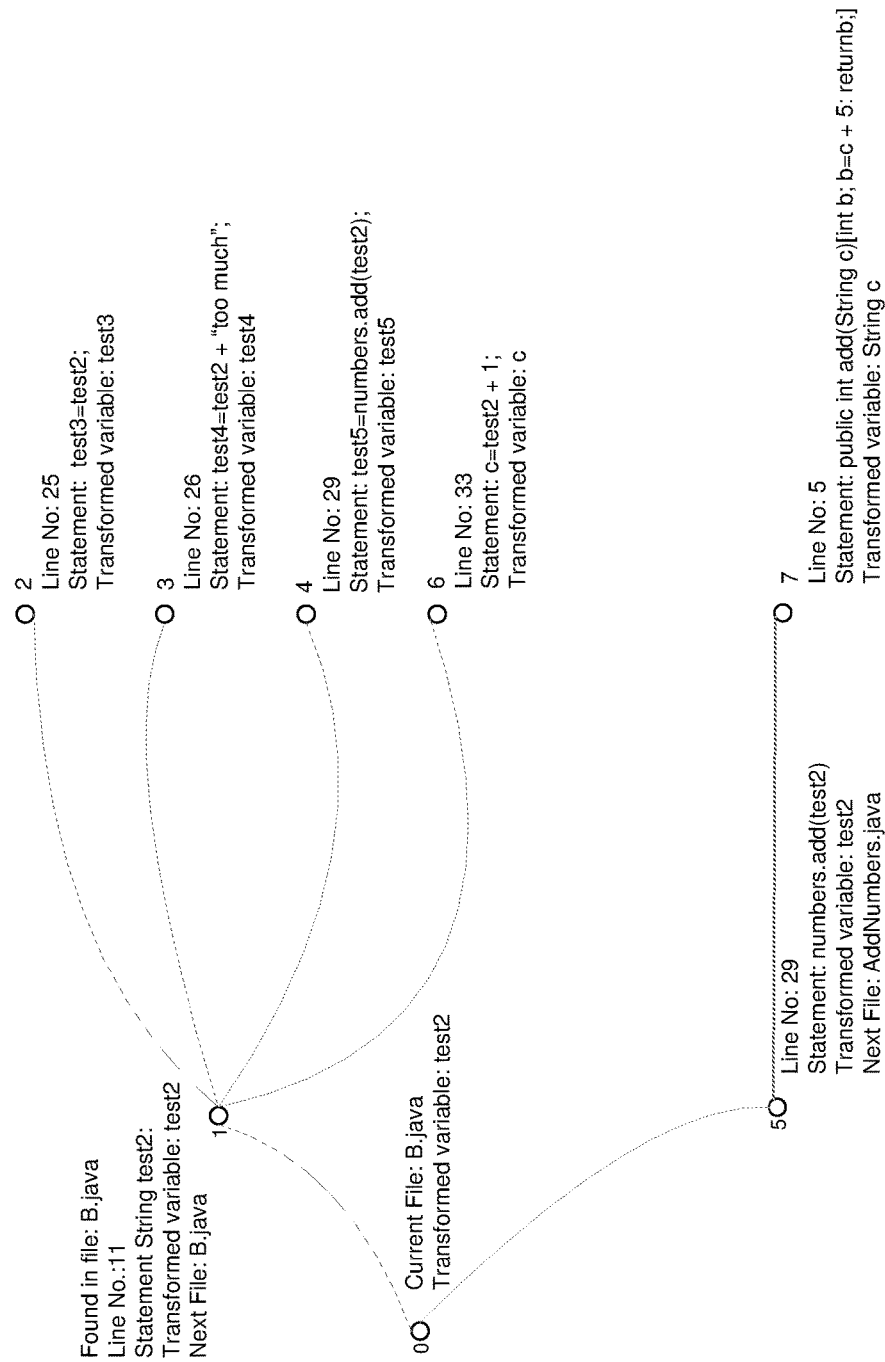
FIG. 9 is a representation of output of the data trajectory finder for a tagged data element, according to one embodiment.

FIG. 9 is a representation of output of the data trajectory finder for a tagged data element, according to one embodiment.

In one or more embodiments, FIG. 9 may represent an output of a data trajectory finder and/or a data element trace. A data element to be traced may take multiple paths in an application. FIG. 9 depicts one such variable taking multiple paths and transformations that the variable/data element undergoes at various levels.

In one or more embodiments, an output of data trace across one or more tiers of an application may be a data tree. The data tree may disclose one or more details across one or more layers of an application. FIG. 9 is an illustration of such an output displayed on a user interface associated with a graphic processing device.

In one or more embodiments, source code (software code) to be traced may be available at one more locations in a computer network. An input for tracing a data element may include data element name, data element file path, application folder path, data element destination layer, start point and an end point.

In one or more embodiments, a user may access an application through a user interface. The application may receive an input from the user. The input may include a data element and/or field name to be traced.

Data element tracing may have multiple advantages. For example, during an analysis of a legacy application about to be migrated, mapping of data elements from source to destination can be done using any tool which implements the method disclosed herein. When a bug fix needs to be done the methods and systems disclosed herein may be used to pinpoint the program(s) that need to be analyzed and/or changed whenever a new enhancement or a bug-fix needs to be done. Further, the methods and systems disclosed herein may be used to point at program(s) responsible for data anomalies and pinpoint various touch points between different layers of the application.

In one or more embodiments, one or more elements may be used to identify the flow status while errors/failures are encountered in a parsing flow. For every insert into the database table, there are one or more columns that may be used to identify a unique user run such as UID, and Trace status. When a file is parsed, along with the probable instances of the code flow, a unique identifier may be generated and stored for each row.

For every row, there may be a status assigned—Completed or Pending based on the trace for the next field/next file. Status Completed may signify that the trace for next field, the next file and the path has started for a specific field. Status Pending may indicate that the trace has not started for the next field/next file. Timestamp may be used for audits and to provide user details about last run with the same UID.

When a user clicks on Search button with the input parameters, there may be a UID generated and displayed on a page. Users may have to keep a track of the UID. In case of failure and the user may have to pick up the flow from where it was stopped, UID will have to be keyed in for further processing.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-Ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method of tracing a data element for flow analysis, comprising:

receiving, through a data processing device, an input of a data element to be traced;

tagging, through the data processing device, the data element to be traced;

selecting, through the data processing device, at least one application tier of an application comprising program files of source code;

parsing, through the data processing device, the selected at least one application tier of the application through a first plugin associated with a first software programming language to find the tagged data element in the source code of the program files, wherein the first plugin associated with the first software programming language is invoked on determination of the first software programming language, tracing, through the data processing device, flow of the tagged data element in the application, wherein the flow defines paths the tagged data element takes and transformations the tagged data element undergoes in the source code of the program files, and wherein, based on the flow, a second plugin associated with a second software programming language is invoked for parsing on determination of the second software programming language;

generating, through the data processing device, based on the parsing, a data flow graph mapping the flow of the tagged data element found in the source code of the program files associated with the at least one application tier; and creating, through the data processing device, a database entry for the found tagged data element in the at least one application tier.

2. The computer implemented method of claim 1, wherein at least one of an assignment operation and a modification operation associated with the tagged data element is traced in the source code of the program files.

3. The computer implemented method claim 1, wherein the input is at least one of a program name, a start point, an end point, an assignment operation, a modification operation, a location of a directory, or a configuration file.

4. The computer implemented method of claim 1, further comprising:

recording, through the data processing device, an entry at the first or second plugin associated with the first or second software programming language, when an instance of tagged data element is encountered.

5. The computer implemented method of claim 1, wherein the first plugin and the second plugin are stored on a plugin database accessible over a computer network.

6. A system of tracing a data element for flow analysis, comprising:

a computer network;

data processing device associated with at least one processor;

a user interface operably associated with the data processing device and a graphic processing device; and at least one memory unit operatively coupled to the data processing device over the computer network and having instructions stored thereon that, when executed by the at least one processor, cause the data processing device to:

receive, through the data processing device, an input of a data element to be traced;

tag, through the data processing device, the data element to be traced, select, through the data processing device, at least one application tier of an application comprising program files of source code, parse, through the data processing device, the selected at least one application tier of the application through a first plugin associated with a first software programming language to find the tagged data element in the source code of the program files, wherein the first plugin associated with the first software programming language is invoked on determination of the first software programming language, trace, through the data processing device, flow of the tagged data element in the application, wherein the flow defines paths the tagged data element takes and transformations the tagged data element undergoes in the source code of the program files, and wherein, based on the flow, a second plugin associated with a second software programming language is invoked for parsing on determination of the second software programming language, generate, through the data processing device, a data flow graph based on the parsing to map the flow of the tagged data element found in the source code of the program files associated with the at least one application tier, create, through the data processing device, a database entry for the found tagged data element in the at least one application tier, and display, through the user interface and the graphic processing device, the data flow graph.

7. The system of claim 6, wherein at least one of an assignment operation and a modification operation associated with the tagged data element is traced in the source code of the program files.

8. The system of claim 6, wherein the input is at least one of a program name, a start point, an end point, an assignment operation, a modification operation, a location of a directory, or a configuration file.

9. The system of claim 6, wherein an entry at the first or second plugin associated with the first or second software programming language is recorded through the data processing device, when an instance of tagged data element is encountered.

10. The system of claim 6, wherein the first plugin and the second plugin are stored on a plugin database accessible over a computer network.

11. One or more non-transitory machine-readable media comprising computer-executable instructions that, when executed, cause a computing system to perform a method of tracing a data element for flow analysis, the method comprising:

receiving, through a data processing device, an input of a data element to be traced;

tagging, through the data processing device, the data element to be traced;

selecting, through the data processing device, at least one application tier of an application comprising program files of source code;

parsing, through the data processing device, the selected at least one application tier of the application through a first plugin associated with a first software programming language to find the tagged data element in the source code of the program files, wherein the first plugin associated with the first software programming language is invoked on determination of the first software programming language, tracing, through the data processing device, flow of the tagged data element in the application, wherein the flow defines paths the tagged data element takes and transformations the tagged data element undergoes in the source code of the program files, and wherein, based on the flow, a second plugin associated with a second software programming language is invoked for parsing on determination of the second software programming language;

generating, through the data processing device, based on the parsing, a data flow graph mapping the flow of the tagged data element found in the source code of the program files associated with the at least one application tier; and creating, through the data processing device, a database entry for the found tagged data element in the at least one application tier, wherein the database entry comprises a name of the tagged data element and one or more properties associated with the tagged data element, the properties comprising a type, a file name, a line number, an operator, an action, a transformed variable, a tier, a next file for tracing, a file path, a leaf node flag, a tier completed, or a proposed next tier for tracing.

* * * * *